United States Patent
Hurtis

(10) Patent No.: US 6,763,896 B1
(45) Date of Patent: Jul. 20, 2004

(54) COMBINATION SOIL CONDITIONING ROTARY REEL AND PRIMARY TILLAGE SYSTEM

(75) Inventor: Paul Hurtis, Mackinaw, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 10/350,228

(22) Filed: Jan. 23, 2003

(51) Int. Cl.[7] ............................................. A01D 34/53
(52) U.S. Cl. ......................... 172/149; 172/144; 56/249
(58) Field of Search .............................. 56/249, 249.5; 172/144, 145, 147, 149

(56) References Cited

U.S. PATENT DOCUMENTS

| | | | | |
|---|---|---|---|---|
| 1,473,519 A | | 11/1923 | Roll | |
| 1,537,262 A | | 5/1925 | Ray | |
| 3,100,372 A | * | 8/1963 | Barth | 56/199 |
| 3,144,745 A | * | 8/1964 | Sharps | 56/249 |
| 3,176,454 A | * | 4/1965 | Jepson et al. | 56/249 |
| 4,109,447 A | * | 8/1978 | Ferguson | 56/13.3 |
| 4,335,569 A | * | 6/1982 | Keeney et al. | 56/249 |
| 4,345,419 A | * | 8/1982 | Chandler | 56/249 |
| 4,703,809 A | | 11/1987 | Van den Ende | 172/147 |
| 4,865,132 A | | 9/1989 | Moore Jr. | 172/196 |
| 5,400,576 A | * | 3/1995 | Smith | 56/249 |
| 5,412,932 A | * | 5/1995 | Schueler | 56/249 |
| 5,474,135 A | | 12/1995 | Schlagel | 172/151 |
| 5,623,817 A | * | 4/1997 | Bricko et al. | 56/7 |
| 5,628,169 A | * | 5/1997 | Stiller et al. | 56/7 |
| 5,632,343 A | | 5/1997 | Gengler | 172/552 |
| 5,634,325 A | * | 6/1997 | Thorman et al. | 56/7 |
| 5,797,460 A | | 8/1998 | Parker et al. | 172/151 |
| 5,822,965 A | * | 10/1998 | Chesack et al. | 56/249 |
| 5,822,966 A | * | 10/1998 | Snell | 56/249 |
| 5,865,016 A | * | 2/1999 | Toman | 56/7 |
| 5,865,017 A | * | 2/1999 | Short | 56/7 |
| 5,896,734 A | * | 4/1999 | Chesack et al. | 56/249 |
| 5,950,409 A | * | 9/1999 | Davies | 56/249 |
| 5,964,300 A | | 10/1999 | Wattonville et al. | 172/700 |
| 6,052,973 A | * | 4/2000 | Tsuchihashi et al. | 56/7 |
| 6,068,061 A | | 5/2000 | Smith et al. | 172/139 |
| 6,253,533 B1 | * | 7/2001 | Ehn, Jr. | 56/249 |
| 6,487,837 B1 | * | 12/2002 | Fillman et al. | 56/11.9 |
| 6,523,334 B1 | * | 2/2003 | Dettmann | 56/11.9 |
| 6,557,334 B2 | * | 5/2003 | Jager | 56/294 |
| 6,612,378 B2 | * | 9/2003 | Sauder | 172/145 |

* cited by examiner

Primary Examiner—Robert E. Pezzuto
Assistant Examiner—Alexandra K. Pechhold
(74) Attorney, Agent, or Firm—Rebecca Henkel; Brant T. Maurer

(57) ABSTRACT

There is disclosed a primary tillage system in combination with a soil conditioner rotary reel that addresses the performance requirement differences due to soil types and moisture conditions that other tillage systems do not address. The combination provides a one-pass seedbed preparation process of a superior quality to that of any heretofore known one-pass systems through the improved performance of the soil conditioning rotary reel. The rotary reel includes a plurality of flat bars attached to support plates in a symmetrical helix arrangement that provide a thorough breakup of clods not heretofore possible.

28 Claims, 4 Drawing Sheets

COMBINATION SOIL CONDITIONING ROTARY REEL AND PRIMARY TILLAGE SYSTEM

BACKGROUND OF THE INVENTION

The present invention relates generally to agricultural tillage and seedbed preparation equipment, and more particularly to an improved soil conditioning rotary reel in combination with a primary tillage system.

Many fall tillage operations that manage residue and reduce soil compaction to improve soil tilth, such as combination deep ripper tools, can create a problem in the spring by leaving large soil clods and holes on the soil surface from the ripper shanks and points. This often leads to difficult-to-manage soils in the spring that can then produce poor seedbed conditions at planting, resulting in yield loss due to poor germination and non-uniform plant stands.

In dry land farming environments it is common to use several types of rolling packers and conditioners in conjunction with primary tillage applications to condition the seedbed zone as well as firm the soil to prevent soil blowing, while maintaining soil moisture ahead of planting. However, these packers and conditioners are not generally used for fall tillage with spring planting in wetter environments due to the difference in soil type, soil moisture, and over-wintering affects.

Packers and traditional soil conditioners used in the spring in a secondary tillage application are not a proper fit for providing soil conditioning in a primary tillage application. Generally, these secondary tillage soil conditioners rely on a "roller effect" to crush sun-baked clods into an almost fine powdery condition, which is acceptable in the seed zone at planting time; however, using these tools in a fall primary tillage application is generally discouraged because the soil is frequently wetter and thus these tools essentially repack soil that has just been loosened for air and water infiltration. Likewise, they tend to make the soil aggregate size too small and fine for the over-wintering process and will likely lead to crusting, runoff, and even blowing.

As used herein, "primary tillage" refers to tillage where the ground working is deeper and the soil is turned, as, for example, with moldboard and chisel plows, at depths greater than four inches. "Primary tillage" is distinguished, for example, from secondary tillage and various cultivation techniques such as disks, "spider" wheels and sweeps, as well as combinations of devices that normally cultivate the surface to nominal depths of two inches, but as deep as three to four inches.

The concept of rotary reels (or basket rollers, or packers, as they are sometimes called) to condition the soil and break clods is, of course, not new; however, the present invention sets forth several unique design features that co-operate to optimize the capabilities of the rotary reel and to achieve the improved results mentioned.

It would be quite advantageous to overcome the problems identified above in a manner as described in the immediately preceding paragraph, and to do so without increasing the workload of the farmer.

SUMMARY OF THE INVENTION

The present invention is designed to improve soil conditions in the fall that translate to spring field conditions that require less seedbed preparation before planting, thereby leading to improved yields by providing better seed-to-soil contact and a more timely planting window for farmers. The unique 6-bar flat-edge rotary reel design breaks clods and moves soil into holes, reduces air pockets and flattens residue to level the soil surface without firming, unlike other known soil conditioners and packers. This fall soil conditioning can be accomplished as part of a one-pass operation when used in conjunction with combination disk rippers or other primary tillage tools, or as a stand-alone separate tillage operation after primary tillage is completed.

The novel rotary reel disclosed is intended to be used in the production of corn, soybeans, and small grains in geographic areas with mulch-till farming practices where soil aggregates do not adequately break down due to over-wintering and need mechanical manipulation to provide a satisfactory seedbed in the spring.

It is an objective of the present invention to provide a primary tillage soil conditioner for soil environment conditions that are typically moist. The rotary reel herein described is intended to properly size the soil aggregate in the seedbed zone in the fall while not re-compacting the soil loosening achieved by the primary tillage. The rotary reel has an optimized reel diameter, flat bar angle of attack, spacing between adjacent flat bars, and machine weight equating to the down pressure applied by the flat bar to cut and condition soil clods. The overall design is further intended to be able to run in the widest operating conditions possible during typical fall primary tillage application, without plugging or packing full of soil.

It is a further objective of the instant invention to provide a primary tillage soil conditioner rotary reel that addresses the performance requirement differences due to soil types and moisture conditions that other soil conditioners do not address. The implement optimizes the number of bars, shape and thickness of the bars, edge design of the bars, radial and tangential angle of attack of the bars to the soil, mounting pattern of the bars (helix verses straight) and the weight of the bars and reel to meet both agronomic and customer-driven performance goals. Agronomic parameters are achieved while maintaining the widest window of operation for the customer in both rocky and wet soil conditions.

It is an even still further objective of the instant invention to provide an improved rotary reel useful in multiple applications. For instance, the reel may be used in strip-till or indexed environments, such as, for example, by the system shown in FIG. 1, in a broadcast environment where the reels essential cover the entire width of the implement, in pull-type or self-propelled implements, in a tillage and soil preparation system, or in a separate implement that includes only the rotary reel(s).

As generally stated above, the present invention is intended to be used either as a stand-alone machine or in conjunction with a primary tillage tool, such as a combination deep ripper, to address rough, uneven soil conditions in the fall. As the soil and residue passes through the machine, the flat bars of the rotary reel cut and break large clods into smaller clods averaging about two to four inches in diameter. This clod size is large enough to protect soil particles from erosion but small enough that they become pliable and easily broken in the spring after over-wintering. In addition, the reel knocks soil off root crowns and moves clods and soil into holes and thereby creates a more level and uniform soil surface.

The present invention also knocks down and conditions residue, accelerating the decomposition process while not burying the residue, but leaving it on the surface. This helps to hold small soil particles in place and prevent them from washing or blowing away. This complete process provides a loose, healthy soil with evenly distributed residue and soil particles suitable for spring cultivation and planting.

These and other objectives are obtained by providing a primary tillage system in combination with a soil conditioner rotary reel that addresses the performance requirement differences due to soil types and moisture conditions that other tillage systems do not address. The combination provides a one-pass seedbed preparation process of a superior quality to that of any heretofore known one-pass systems through the improved performance of the soil conditioning rotary reel. The rotary reel includes a plurality of flat bars attached to support plates in a symmetrical helix arrangement that provide a thorough breakup of clods not heretofore possible.

DETAILED DESCRIPTION OF THE PREFERRED EMBODIMENT

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

Figure 1:
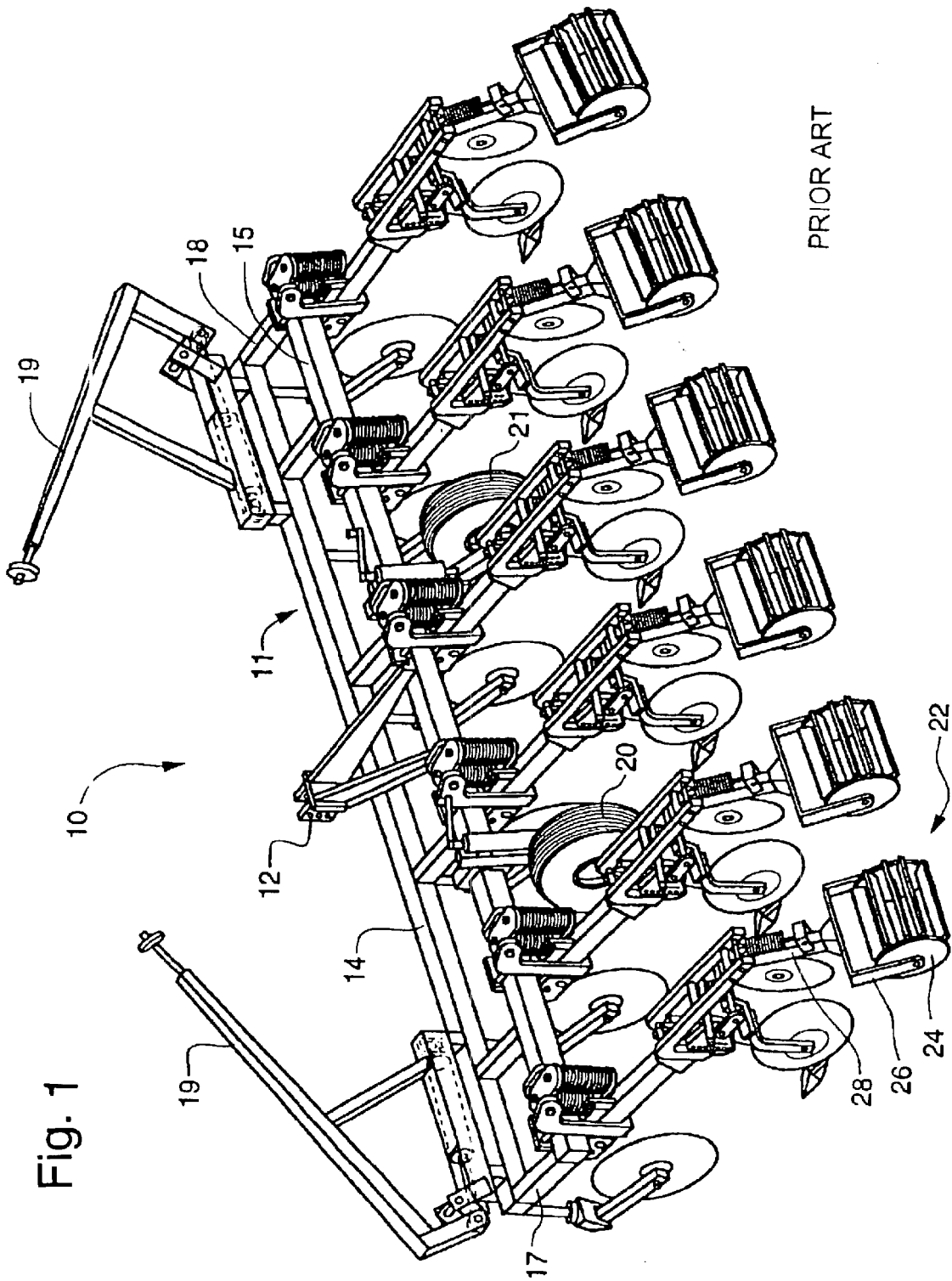
FIG. 1 is a left rear perspective view of a primary tillage system showing the combination thereof with a known soil conditioning rotary reel.

Referring now to FIG. 1, reference numeral 10 generally designates an exemplary primary tillage system or implement including a soil conditioning rotary reel. Implement 10 includes a main frame generally designated 11 that is adapted to be attached at its front to the rear of an agricultural tractor (not shown) by means of a conventional 3-point hitch 12. Larger main frames incorporate foldable toolbar wings for reduced transport widths. Frame 11 is a substantial structure intended to withstand significant operational forces and to maintain its integrity for many years of reliable service. Two generally parallel and coextensive elongate box beams, 14, 15 are interconnected at the ends thereof by beams 17, 18 and by additional beams therebetween. Additionally, the structural support legs of hitch 12 are affixed to each of beams 14, 15 adding strength to the hitch and the main frame. Box beams 14, 15 serve not only as the primary structural members of the main frame, but also as toolbars. The main frame may take other shapes and may be constructed of different materials and structural elements, the important result being a sound configuration to adequately support the various components of the implement to be further described below. This particular design, which in practice is made primarily of 4×6 or 6×6 inch box beams, allows for long life and durability, additional residue flow, and provides the weight necessary to penetrate the toughest soil conditions.

Frame 11 is supported for movement across a field or along a road by gauge wheels 20, 21 that may be of any known construction and design. Gauge wheels 20, 21 are each part of a unitized structure that includes a sturdy screw-adjustment for depth regulation, as well as pins to retain adjustment, all of which is attached to elongate frame member 14 or 15 by known clamping devices that allow the wheel units to be selectively placed along the length of frame member 15 as part of an adjustment of the spacing between seedbed strips. Depth indicators may also be added to make fine-tuning of depth penetration more convenient. Two such wheel units are shown in the drawings; however, depending upon the size and weight of the implement and the type of wheels used, more wheels may be appropriate. It is also possible that the particular configuration of elements, and the size and weight of the tractor being used, may benefit from the addition of lift-assist wheels (not shown). Lift-assist wheels are known in the agricultural industry as add-on structure that minimizes hitch stress and helps the tractor's 3-point hitch lift implements, as well as safer tractor steering and stopping. Such units may include a stabilizing torque-tube to minimize wobble and ensure stable transport. Lift-assist wheels may also be adjustable for level field operation and optimum transport height.

Row markers 19 are key to setting up or straightening existing rows. As is obvious from FIG. 1, the marker units are movable, usually hydraulically, between transport positions, as seen in FIG. 1, and operational positions where they pivot outwardly to contact the soil, leaving a small visible furrow.

Raising or lowering the front of the main frame is accomplished by raising or lowering the 3-point hitch of the tractor. The 3-point hitch and the gauge wheels 20, 21, adjust the depth of penetration of the soil-engaging elements.

Implement 10 is further comprised of a series of similar working units, each unit including a series of apparatus; in the configuration shown in FIG. 1 there are six such working units transversely and uniformly spaced across the width of the main frame. For purposes of discussion these will be referred to as "working units" even though they are not necessarily unitized in construction, i.e., some parts of each working unit are attached separately to the main frame 11 rather than being assembled separately and attached to the frame as a unit. This is not to say that a unitized structure could not be used, but rather that many known embodiments are not constructed as a unitary structure. These working units come in various types, numbers and spacing to best fit the needs of the user.

The rotary reel of the instant invention would, in one operational mode, be mounted similarly to reel assembly 22 of FIG. 1, i.e., a reel 24 is mounted to a yoke 26 on bearings to provide smooth and free relative rotation of the reel. The yoke 26 is affixed to an arm pivotally mounted to a working unit, beam 17, or a toolbar. The reel assembly 22 is shown to include an adjustable spring pack, which would be used only when necessary to satisfy operational requirements. If down-pressure is required to augment the weight of the reel itself, any appropriate mechanism or approach can be used, such as, for example, spring packs or weights. FIG. 1 is a depiction of a more or less generic mounted primary tillage system or implement, and the reel shown in this figure is not that shown in the remainder of the figures or disclosed in detail herein.

Figure 2:
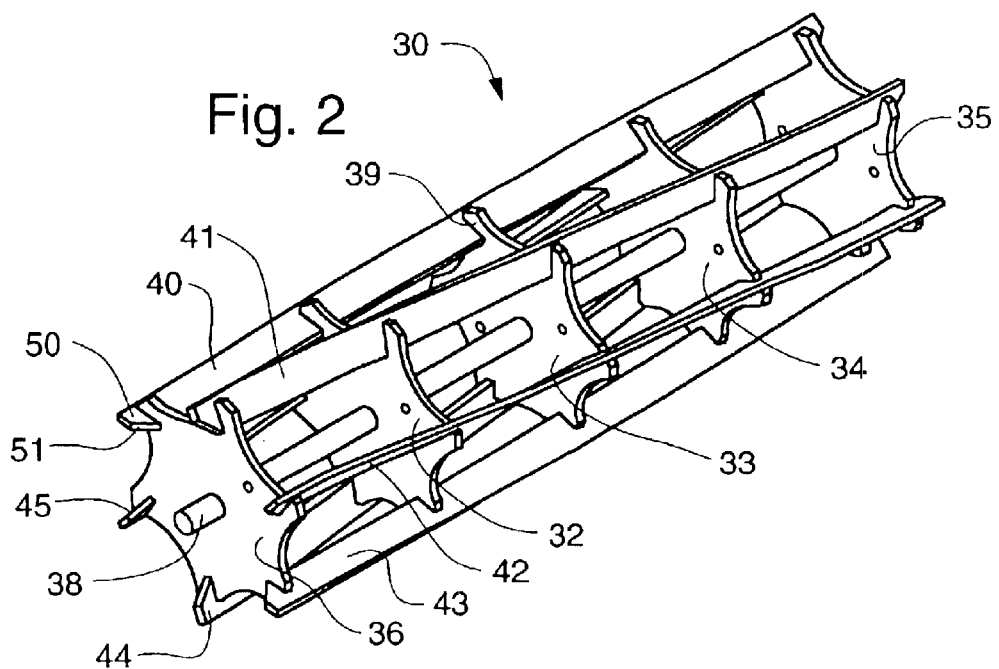
FIG. 2 is a left rear perspective view of a rotary reel conforming to the concepts of the instant invention.
Figure 3:
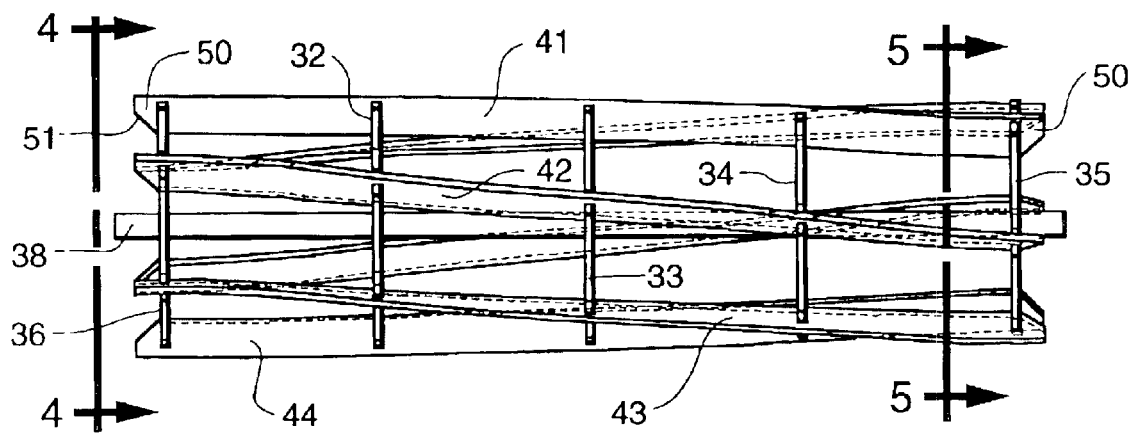
FIG. 3 is a rear view of the rotary reel of FIG. 2.

Referring now to FIGS. 2 and 3, a general depiction of rotary reel 30 conforming to the teachings of the instant invention can be seen to comprise a plurality of identical support plates including inner support plates 32–34 and end plates 35 and 36. The support plates are partially maintained in transverse alignment by a support shaft 38 that extends through centrally located apertures in each of the support plates. Support shaft 38 is affixed, as by welding, to each of the support plates and extends beyond the end plates 35 and 36 to fit into bearings on a yoke like that shown in FIG. 1 and referenced by numeral 26. Several elongate helically formed flat bars 40–45 extend from end-to-end across the supports and are affixed thereto. The number of support plates and the length of the bars can vary as required to match various machine width swaths when combining operations. The support plates have slots, as at 39 in FIG. 2, into which the bars fit. After welding, this arrangement provides superior support and strength for the connection.

The preferred embodiment, found to provide the most overall satisfactory results, is a six bar 16-in diameter reel. This provides the proper soil aggregate sizing in combination with a primary tillage system as operated in the range of 4 and 8 mph. This preferred embodiment has an approximate spacing of 8.4 inches as measured on the circumference of the rotary reel, with a maximum straight-line distance of less than six inches between two adjacent bars. This is a key factor that allows design variations in the diameter and number of bars, but maintains the relative effectiveness of the overall conditioning performed by the reel. By keeping the maximum distance between two adjacent bars less than six inches, the design will, on average, produce substantially no clods larger than this size (six inches).

Figure 7:
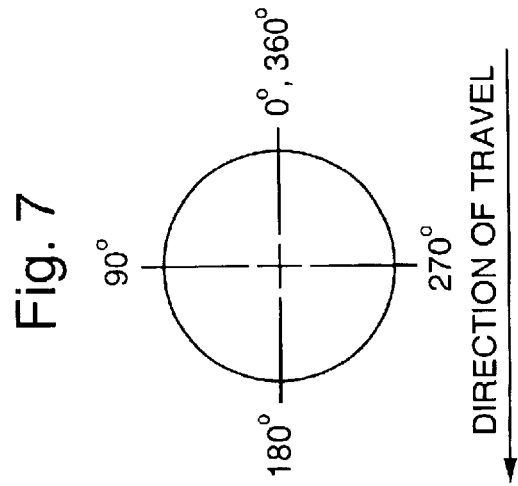
FIG. 7 is a depiction, for reference, of the possible angular displacement of the circular left end of the rotary reel of the instant invention as it moves in the normal direction of travel.

The following references to degrees can best be understood by viewing first the depiction of FIG. 7. The direction of travel of the implement is to the left, so the reel will rotate in a counter-clockwise direction and the ground would be at the bottom, or in the direction of the 270-degree reference. Each helically formed flat bar maintains an angle of attack in the range of 23 to 27 degrees, preferably 25 degrees, relative to the 270-degree orientation, which provides the balance of a small edge for maintaining the necessary pressure in pounds per square inch ("psi") to cut soil clods, yet supplies the strength to withstand the punishment of hitting rocks and other obstructions. The most important concepts to understand regarding the angle of attack of the bar is first that the reel is heavy enough to actually penetrate the ground approximately 2.5 inches, and second that the bars will thus contact clods somewhere between the 180- and the 210-degree location. The rotary reel's forward momentum combined with each individual bar's angle of attack produces highly effective clod cutting and soil conditioning.

While other sizes will produce improved results over existing soil conditioners and packers, in the preferred embodiment, each bar 40–45 is comprised of flat steel approximately 0.313 inches thick by 2.5 inches wide. This size further promotes the balance of a small edge for maintaining psi to cut soil clods, yet adequate strength to withstand the punishment of hitting rocks and other obstructions. More particularly, the preferred embodiment optimizes clod cutting pressure, soil penetration, and durability. The 0.313-inch thickness is thin enough to still cut clods without requiring the expense of a knife-edge. The 2.5 inch wide surface helps minimize the amount of surface area of the flat bars as they have passed the 270-degree orientation and begin passively rolling out of the ground.

Figure 4:
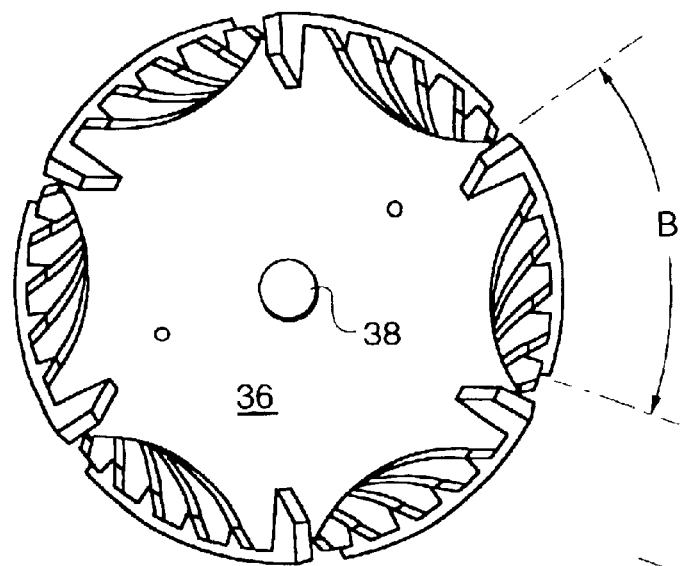
FIG. 4 is a left end view of the rotary reel of FIG. 3.
Figure 5:
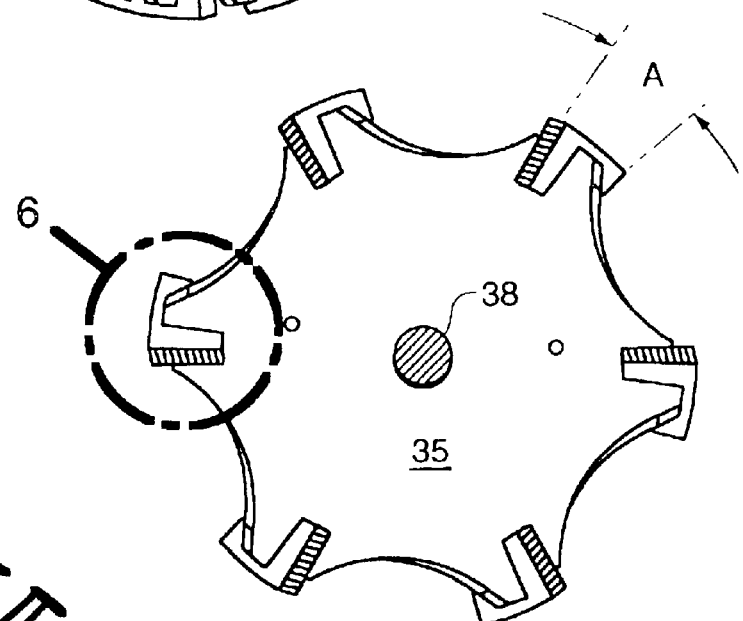
FIG. 5 is a sectional view, taken along lines 5—5 of FIG. 3.

Each helically formed bar 40–45 has an approximate 8- to 11-degree twist per support plate, as shown as angle A in FIG. 5, to assist in maintaining a smooth operation in the field without creating machine bounce and therefore high cycle fatigue that results with straight bar reels. In the preferred embodiment, this angle is approximately 9.38 degrees. FIG. 4 shows the total twist as angle B. In the preferred embodiment angle A is approximately 37.5 degrees. More particularly, the twist provides performance enhancement on a lateral rotary reel by maintaining a consistent amount of blade engagement with the soil (which also means consistent pressure) for smooth operation. This additionally improves the durability of the reel and supporting structure by limiting the high stress cycles of straight bars on a lateral rotary reel. As stated above, the amount of the helical form relates to the number of bars and the diameter of the rotary reel. The actual helical form can vary to achieve the optimum geometry with other diameters. The twist may be either right- or left-handed.

Figure 6:
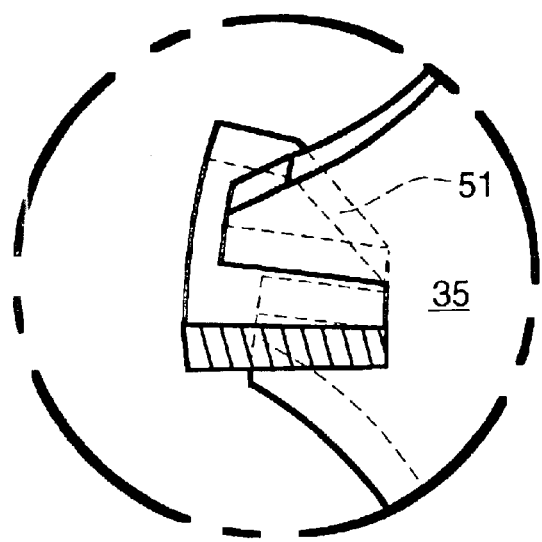
FIG. 6 is an exploded perspective view of the connection between the end support plate and one bar from FIG. 5.

Referring now to FIGS. 2, 3 and 6, it can be seen that each bar 40–45 in the preferred embodiment is formed with an extended portion 50 on each end that allows it to extend past the end support plates 35 and 36. This extension is cut inwardly at approximately 45 degrees, as at 51, and provides for the proper soil conditioning between adjacent transversely spaced reels (relative to the direction of travel) in an overall system without weed or residue wrapping on the end of the bar. Effectively, the gap between two adjacent reels (as measured from the outside ends of the bars) is less than the straight-line distance between two bars on a particular reel—providing proper soil conditioning. Weeds, residue, or other debris slides off the bar due to the notched end. This design feature results in premium soil clod sizing with all rotary reels in line laterally while not compromising agronomic performance. This design also allows room for the rotary reel bearings and supports on each end, yet extends the bars past the reel end support plates 35 and 36 to maintain a gap of equal or less than the straight-line spacing between two adjacent bars on the same rotary reel.

The preferred spacing between support plates is in the range of about 12.5 inches to 14 inches to provide a balance of clearance to prevent soil build-up in wet conditions and strength for protection of the helical bars against rock damage; however, spacings outside this range may provide acceptable results. This preferred range has been optimized with the speed of operation, section and material properties of the bars.

As can be seen in the figures, particularly FIG. 6, each reel support plate captures the bar on both long surfaces (the 2.5 inch surface) for maximum strength. The support plate material is staggered on either side of the bar to prevent a high stress concentration due to welding at the highest load location. The longer support is provided on the backside of the bar relative to the motion to provide maximum strength.

Each support plate 32–36 includes directional welds that start at the outer portion of the bar and end towards the center of the reel to prevent the stress concentration of the weld crater at termination from being located at the highest loaded point of the bar.

A preferred weight per foot of implement width of down pressure applied using this rotary reel design is 120 pounds per foot (in the range of approximately 110–130 pounds per foot). This down pressure has been optimized to cut hard dry clods and wet sticky clods without digging into the soil (self-gauging operating depth) and creating a scoop shovel effect that can result in plugging of the reel with soil.

Figure 8:
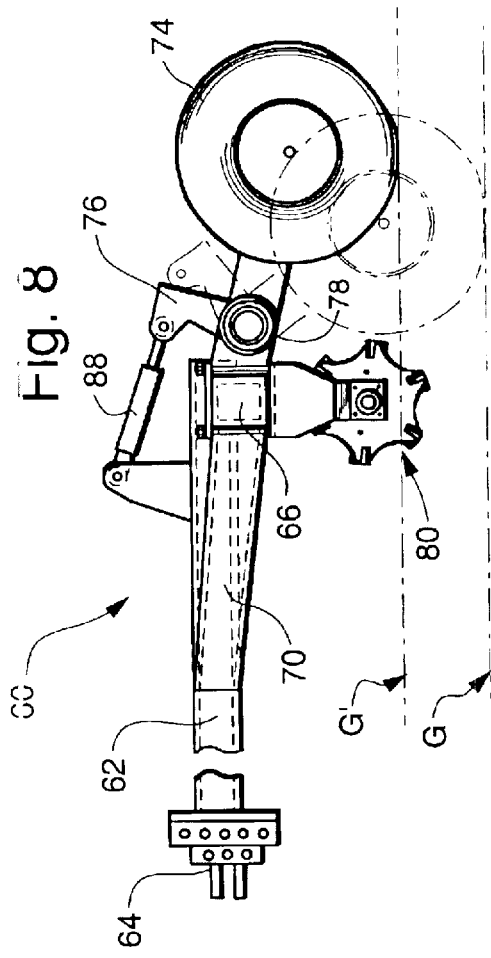
FIG. 8 is a side elevational view of a stand-alone embodiment with the ground wheels in solid in the operating position and in phantom in the transport position.
Figure 9:
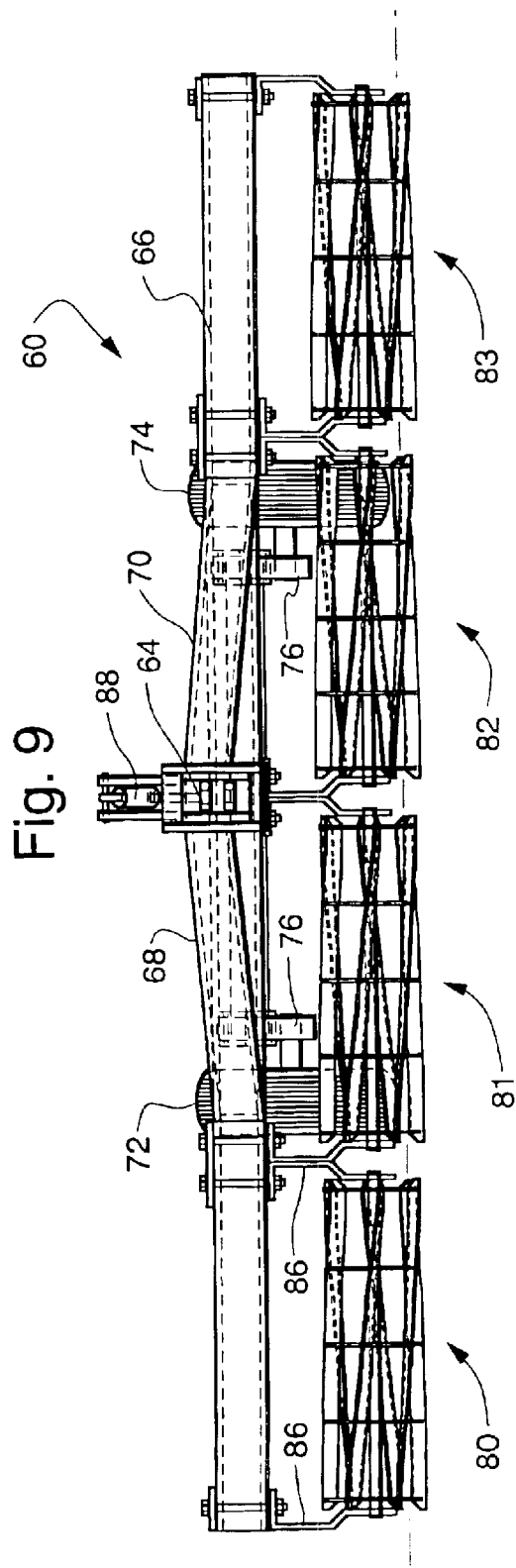
FIG. 9 is a front elevational view of the embodiment of FIG. 8 with the wheels in the operating position.

FIGS. 8 and 9 show a rotary reel system that can be either affixed to the rear of a primary tillage system or towed by a tractor in a separate operation depending upon the specific subjective circumstances of the operator. FIG. 8 is a side elevational view of the finishing implement 60 to include a tongue 62 with a forwardly located hitch 64 for ready attachment to either a tractor or a primary tillage implement. A toolbar 66 extends transversely across the width of the implement and is strengthened by braces 68, 70. A pair of gauge/transport wheels 72, 74 are affixed to an L-shaped support bracket 76 and rotatable about shaft 78. A plurality of soil conditioning rotary reels 80–83 is affixed at each end to the bottom of the toolbar 66 by fixed brackets 86 on bearings (not shown) that permit free rotation of the rotary reels. By lengthening or shortening the ram of hydraulic cylinder 88, the operator may selectively raise or lower the rear of implement 60, and thus rotary reels 80–83, by moving the wheels from the dotted line position in relative to ground G (raised position) to the solid line position relative to ground G' (lowered position).

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A one-pass tillage system comprising the combination of:
   a primary tillage implement adapted to be drawn across the ground by a tractor and including:
   a frame, a plurality of working units mounted in laterally-spaced relation on said frame, each said working unit comprising a plurality of soil-engaging implements to loosen and break up the soil, the soil-engaging implements being positioned on the frame to cultivate the soil to a depth below a surface of the soil; and
   a soil conditioning rotary reel associated with the working units, each rotary reel including:
   an elongate support shaft having first and second opposing ends;
   a plurality of generally circular support plates affixed to and uniformly spaced along the length of said support shaft, said plurality of support plates including two end plates, one adjacent to but spaced from each said first and second ends of said support shaft, each said support plate having a plurality of connection points regularly spaced along the periphery thereof;
   a plurality of elongate bars affixed to each support plate, said bars being rectangular in cross-section and each affixed to one of said plurality of connection points on each said support plate such that a relatively thin generally flat edge of the bar is directed generally radially outward;
   each said bar containing a helical twist and said connection points on said support plates positioned relative to one another on adjacent support plates such that said bars form a helical cutting edge across the width of the reel; and
   a support structure attached to said frame and said support shaft to maintain said rotary reel in operational position on the ground behind said primary tillage system.

2. The tillage system of claim 1, wherein:
said connection points are slots, and said bars fit into said slots.

3. The tillage system of claim 2, wherein:
the straight-line distance between adjacent bars is less than six inches.

4. The tillage system of claim 3, wherein:
the diameter of said support plates is 16 inches, and the plurality of bars is six.

5. The tillage system of claim 4, wherein:
said rectangular cross-section of said bars is approximately 2.5 inches by approximately 0.313 inches.

6. The tillage system of claim 5, wherein:
the angle of attack of each said bar is in the range of 23 to 27 degrees to a line transverse to the direction of travel at 270 degrees, where 180 degrees is the direction of travel, 0 degrees is opposite the direction of travel, 90 degrees is upward and 270 degrees is toward the ground.

7. The tillage system of claim 6, wherein:
said angle of attack is 25 degrees.

8. The tillage system of claim 7, wherein:
said plurality of support plates is positioned relative to each other a distance in the range of 12.5 inches to 14 inches.

9. The tillage system of claim 8, wherein:
said plurality of bars extends beyond the end plates and each has an inwardly angled edge of approximately 45 degrees with said cutting edge.

10. The implement of claim 9, wherein:
the gap between adjacent rotary reels, as measured from the ends of said bars, is less than the straight-line distance between two adjacent bars on a particular reel.

11. The implement of claim 10, wherein:
the weight per foot of implement width of down pressure is in the range of 110 to 130 pounds.

12. The implement of claim 11, wherein:
the weight per foot of implement width of down pressure is approximately 120 pounds.

13. The tillage system of claim 1, wherein:
the angle of attack of each said bar is in the range of 23 to 27 degrees to a line transverse to the direction of travel at 270 degrees, where 180 degrees is the direction of travel, 0 degrees is opposite the direction of travel, 90 degrees is upward and 270 degrees is toward the ground.

14. The tillage system of claim 13, wherein:
said plurality of support plates is positioned relative to each other a distance in the range of 12.5 inches to 14 inches.

15. The tillage system of claim 2, wherein:
each said bar containing a helical twist and said slots in said support plates positioned relative to one another on adjacent support plates such that said bars form a helical cutting edge across the width of the reel, said twist in said bar between support plates being in the range of 8 to 11 degrees.

16. The tillage system of claim 15, wherein:

the gap between adjacent rotary reels, as measured from the ends of said bars; is less than the straight-line distance between two adjacent bars on a particular reel.

17. A one-pass tillage system comprising:

a primary tillage implement adapted to be drawn across the ground by a tractor and including a frame, a plurality of working units mounted in laterally-spaced relation on said frame, each said working unit comprising a plurality of soil-engaging implements to loosen and break up the soil; and a plurality of soil conditioning rotary reels, each reel including:

an elongate support shaft having first and second opposing ends;

a plurality of generally circular support plates with an approximate 16 inch diameter affixed to and uniformly spaced along the length of said support shaft, said plurality of support plates including two end plates, one adjacent to but spaced from each said first and second ends of said support shaft, each said support plate including a plurality of generally radially directed slots regularly spaced along the periphery thereof;

a plurality of elongate bars affixed to each support plate, said bars being rectangular in cross-section, measuring approximately 2.5 inches by approximately 0.313 inches, and each fitting into one of said plurality of slots on each said support plate such that a relatively thin generally flat edge of the bar is directed generally radially outward, the straight-line distance between adjacent bars being less than six inches, each said bar containing a helical twist and said slots in said support plates positioned relative to one another on adjacent support plates such that said bars form a helical cutting edge across the width of the reel, said twist in said bar between support plates being in the range of 8 to 11 degrees; and a support structure attached to said frame and said support shaft to maintain said rotary reel in operational position on the ground behind said primary tillage system.

18. The tillage system of claim 17, wherein:

said working units are row units of an indexed tillage system; and said support structure includes a generally inverted u-shaped support yoke affixed to said first and second ends of each said support shaft such that said reel may rotate freely within the support yoke, said yoke is attached to said frame member such that a rotary reel trails each said row unit.

19. The implement of claim 17, further including:

said working units are part of a broadcast tillage system; and said support structure is affixed to said first and second ends of each said support shaft such that each said reel may rotate freely such that each rotary reel trails more that one working unit.

20. A one-pass tillage system comprising:

a primary tillage implement adapted to be drawn across the ground by a tractor and including a frame, a plurality of working units mounted in laterally-spaced relation on said frame, each said working unit comprising a plurality of soil-engaging implements to loosen and break up the soil; and a plurality of soil conditioning rotary reels, each reel including:

an elongate support shaft having first and second opposing ends;

said plurality of generally support plates are circular and affixed to and uniformly spaced along the length of said support shaft, said plurality of support plates including two end plates, one adjacent to but spaced from each said first and second ends of said support shaft, each said support plate including a plurality of generally radially directed slots regularly spaced along the periphery thereof;

said plurality of elongate bars are affixed to each support plate, said bars being rectangular in cross-section and each fitting into one of said plurality of slots on each said support plate such that a relatively thin generally flat edge of the bar is directed generally radially outward;

each said bar containing a helical twist and said slots in said support plates positioned relative to one another on adjacent support plates such that said bars form a helical cutting edge across the width of the reel;

the angle of attack of each said bar is in the range of 23 to 27 degrees to a line transverse to the direction of travel at 270 degrees, where 180 degrees is the direction of travel, 0 degrees is opposite the direction of travel, 90 degrees is upward and 270 degrees is toward the ground; and a generally inverted u-shaped support yoke affixed to said first and second ends of said support shaft and said frame such that said reel may rotate freely within the support yoke in operational position on the ground behind said primary tillage system.

21. The tillage system of claim 20, wherein:

said angle of attack is approximately 25 degrees.

22. The tillage system of claim 21, wherein:

the straight-line distance between adjacent bars is less than six inches.

23. The tillage system of claim 22, wherein:

the end of said plurality of bars extends beyond the end plates and each has an inwardly angled edge of approximately 45 degrees with said cutting edge.

24. The tillage system of claim 23, wherein:

each said bar containing a helical twist and said slots in said support plates positioned relative to one another on adjacent support plates such that said bars form a helical cutting edge across the width of the reel, said twist in said bar between support plates being in the range of 8 to 11 degrees.

25. The tillage system of claim 24, wherein:

the gap between adjacent rotary reels, as measured from the ends of said bars, is less than the straight-line distance between two adjacent bars on a particular reel.

26. A one-pass tillage system comprising the combination of:

a primary tillage implement adapted to be drawn across the ground by a tractor and including:

a frame, a plurality of working units mounted in laterally-spaced relation on said frame, each said working unit comprising a plurality of soil-engaging implements to loosen and break up the soil; and a soil conditioning rotary reel associated with the working units, each rotary reel including:

an elongate support shaft having first and second opposing ends;

a plurality of generally circular support plates affixed to and uniformly spaced along the length of said support shaft, said plurality of support plates including two end plates, one adjacent to but spaced from each said first and second ends of said support shaft, each said support plate having a plurality of connection points regularly spaced along the periphery thereof;

a plurality of elongate bars affixed to each support plate, said bars being rectangular in cross-section and each affixed to one of said plurality of connection points on each said support plate such that a relatively thin generally flat edge of the bar is directed generally radially outward;

each said bar containing a helical twist and said connection points on said support plates positioned relative to one another on adjacent support plates such that said bars form a helical cutting edge across the width of the reel; and a support structure attached to said frame and said support shaft to maintain said rotary reel in operational position on the ground behind said primary tillage system, wherein said connection points are slots, and said bars fit into said slots, wherein the straight-line distance between adjacent bars is less than six inches, wherein the diameter of said support plates is 16 inches, and the plurality of bars is six, wherein said rectangular cross-section of said bars is approximately 2.5 inches by approximately 0.313 inches, and wherein the angle of attack of each said bar is in the range of 23 to 27 degrees to a line transverse to the direction of travel at 270 degrees, where 180 degrees is the direction of travel, 0 degrees is opposite the direction of travel, 90 degrees is upward and 270 degrees is toward the ground.

27. A one-pass tillage system comprising the combination of:

a primary tillage implement adapted to be drawn across the ground by a tractor and including:

a frame, a plurality of working units mounted in laterally-spaced relation on said frame, each said working unit comprising a plurality of soil-engaging implements to loosen and break up the soil; and a soil conditioning rotary reel associated with the working units, each rotary reel including:

an elongate support shaft having first and second opposing ends;

a plurality of generally circular support plates affixed to and uniformly spaced along the length of said support shaft, said plurality of support plates including two end plates, one adjacent to but spaced from each said first and second ends of said support shaft, each said support plate having a plurality of connection points regularly spaced along the periphery thereof;

a plurality of elongate bars affixed to each support plate, said bars being rectangular in cross-section and each affixed to one of said plurality of connection points on each said support plate such that a relatively thin generally flat edge of the bar is directed generally radially outward;

each said bar containing a helical twist and said connection points on said support plates positioned relative to one another on adjacent support plates such that said bars form a helical cutting edge across the width of the reel; and a support structure attached to said frame and said support shaft to maintain said rotary reel in operational position on the ground behind said primary tillage system, wherein the angle of attack of each said bar is in the range of 23 to 27 degrees to a line transverse to the direction of travel at 270 degrees, where 180 degrees is the direction of travel, 0 degrees is opposite the direction of travel, 90 degrees is upward and 270 degrees is toward the ground.

28. A one-pass tillage system comprising the combination of:

a primary tillage implement adapted to be drawn across the ground by a tractor and including:

a frame, a plurality of working units mounted in laterally-spaced relation on said frame, each said working unit comprising a plurality of soil-engaging implements to loosen and break up the soil; and a soil conditioning rotary reel associated with the working units, each rotary reel including:

an elongate support shaft having first and second opposing ends;

a plurality of generally circular support plates affixed to and uniformly spaced along the length of said support shaft, said plurality of support plates including two end plates, one adjacent to but spaced from each said first and second ends of said support shaft, each said support plate having a plurality of connection points regularly spaced along the periphery thereof;

a plurality of elongate bars affixed to each support plate, said bars being rectangular in cross-section and each affixed to one of said plurality of connection points on each said support plate such that a relatively thin generally flat edge of the bar is directed generally radially outward;

each said bar containing a helical twist and said connection points on said support plates positioned relative to one another on adjacent support plates such that said bars form a helical cutting edge across the width of the reel; and a support structure attached to said frame and said support shaft to maintain said rotary reel in operational position on the ground behind said primary tillage system, wherein said connection points are slots, and said bars fit into said slots, and wherein each said bar containing a helical twist and said slots in said support plates positioned relative to one another on adjacent support plates such that said bars form a helical cutting edge across the width of the reel, said twist in said bar between support plates being in the range of 8 to 11 degrees.

* * * * *